US006951611B2

(12) United States Patent
Dannenmaier et al.

(10) Patent No.: US 6,951,611 B2
(45) Date of Patent: Oct. 4, 2005

(54) FILTERS AND METHOD FOR PRODUCING FILTERS

(75) Inventors: Jürgen Dannenmaier, Balingen (DE); Herbert Raabe, Haigerloch-Stetten (DE); Manfred Pirner, Hechingen (DE)

(73) Assignee: Gambro Dialysatoren GmbH & Co. KG (DE)

( * ) Notice: Subject to any disclaimer, the term of this patent is extended or adjusted under 35 U.S.C. 154(b) by 0 days.

(21) Appl. No.: 10/813,750

(22) Filed: Mar. 30, 2004

(65) Prior Publication Data

US 2004/0182772 A1 Sep. 23, 2004

Related U.S. Application Data

(63) Continuation of application No. 09/889,220, filed as application No. PCT/IB00/00070 on Jan. 19, 2000, now abandoned.

(30) Foreign Application Priority Data

Jan. 29, 1999 (SE) .............................................. 9900283

(51) Int. Cl.⁷ .............................................. B01D 63/02
(52) U.S. Cl. ........................... 210/321.89; 210/321.88; 210/321.8; 210/500.23; 156/172; 156/175; 156/169; 264/258; 264/263
(58) Field of Search ....................... 210/321.61, 321.67, 210/321.88, 321.89, 321.78, 321.79, 321.8, 500.23; 156/172, 175, 169; 264/258, 263; 29/411, 412

(56) References Cited

U.S. PATENT DOCUMENTS

| 4,038,190 A |   | 7/1977 | Baudet et al. |
| 4,054,527 A |   | 10/1977 | Esmond |
| 4,341,005 A |   | 7/1982 | Oscarsson |
| 4,343,668 A |   | 8/1982 | Francisoud et al. |
| 4,724,900 A | * | 2/1988 | Baurmeister et al. ......... 165/76 |

FOREIGN PATENT DOCUMENTS

| DE | 28 24 898 A1 | 12/1978 |
| DE | 28 44 941 A1 | 4/1979 |
| DE | 28 45 002 A1 | 4/1979 |
| DE | 28 45 003 A1 | 4/1979 |
| EP | 0 200 158 A1 | 11/1986 |
| WO | WO-96/04068 A1 | 2/1996 |

* cited by examiner

*Primary Examiner*—Joseph H Drodge
*Assistant Examiner*—Krishna S. Menon
(74) *Attorney, Agent, or Firm*—Lerner, David, Littenberg, Krumholz & Mentlik, LLP

(57) ABSTRACT

Methods and apparatus are disclosed for producing hollow fiber membrane-containing filters. The methods include laying a plurality of hollow fibers in a first portion of a filter housing to form a bundle, forming first and second portions into a filter housing, sealing the portions together, connecting the plurality of hollow fibers together at at least one end of the filter housing, connecting the hollow fibers to the filter housing, and simultaneously adhering the first and second portions of the filter housing together by applying a potting compound thereto, and cutting the ends of the hollow fibers at at least one end thereof, whereby the hollow fibers include open ends.

11 Claims, 5 Drawing Sheets

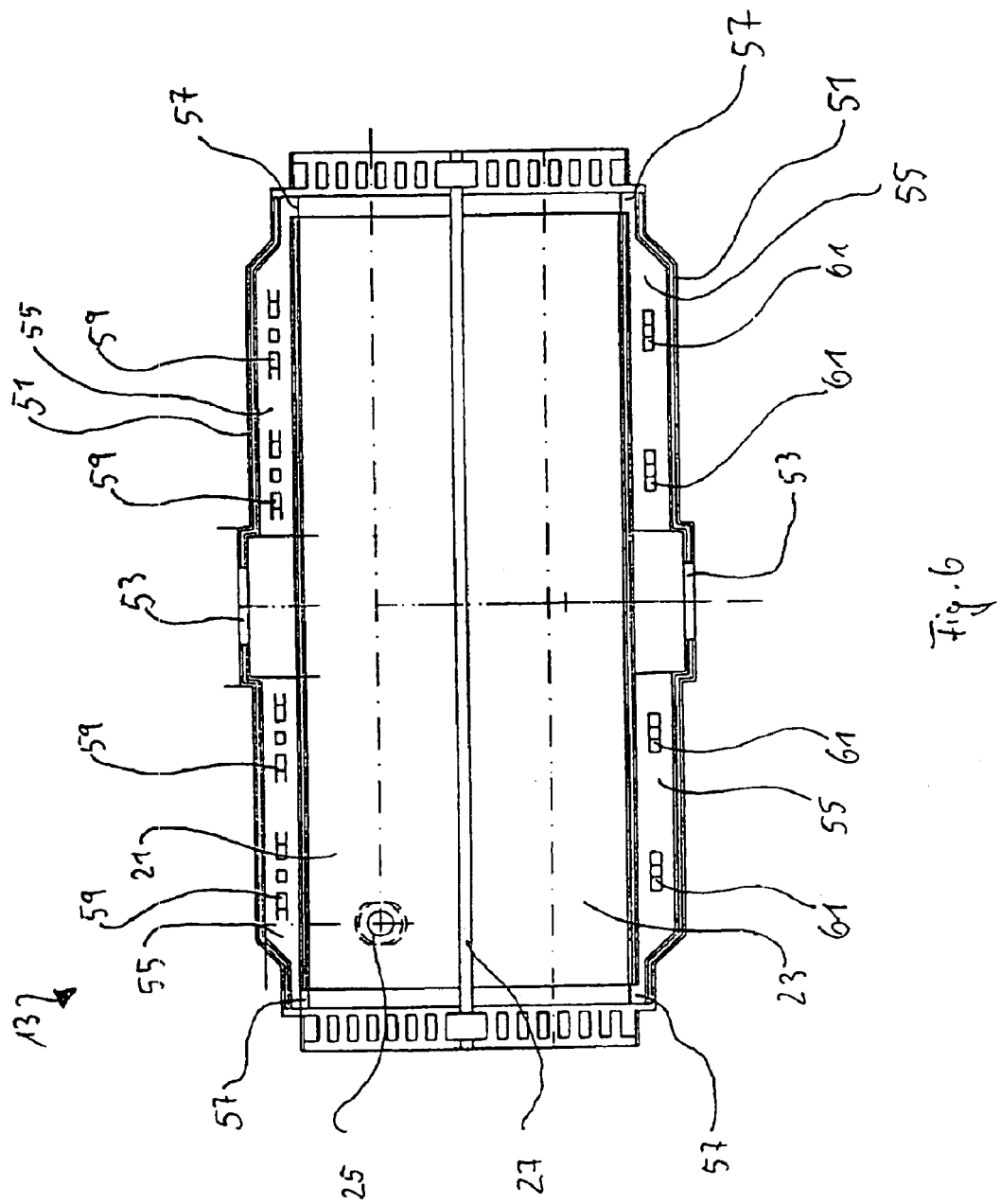

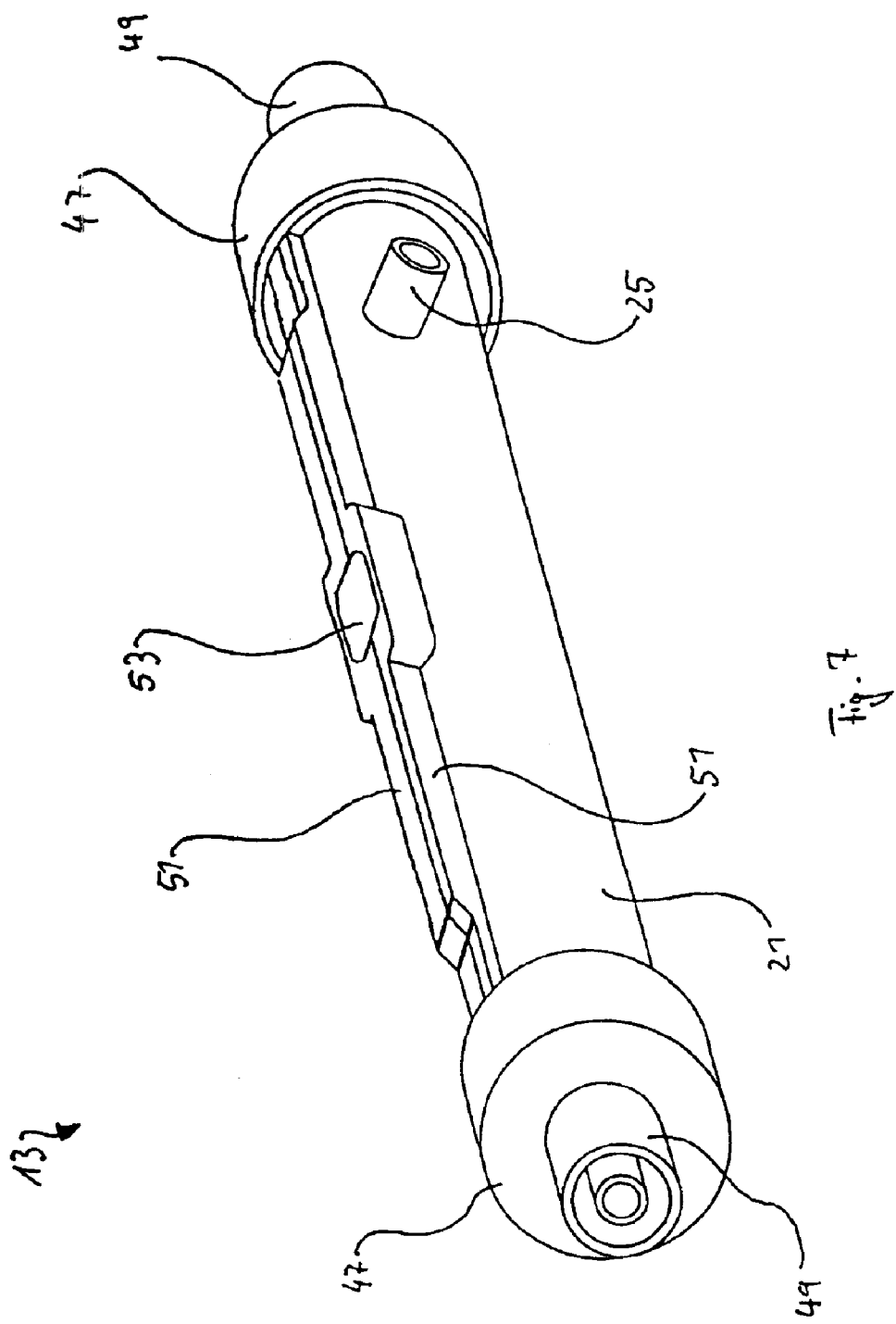

FILTERS AND METHOD FOR PRODUCING FILTERS

CROSS REFERENCE TO RELATED APPLICATIONS

The present application is a continuation of U.S. application Ser. No. 09/889,220, filed on Jul. 12, 2001 now abandoned, the disclosure of which is incorporated by reference herein.

FIELD OF THE INVENTION

The present invention relates to a method for producing filters with membranes of hollow fibers, for example for dialysis. More particularly, the present invention relates to a filter with membranes of hollow fibers, in which the hollow fibers are arranged as a bundle essentially parallel to one another in a tubular filter housing.

BACKGROUND OF THE INVENTION

Filters with membranes of hollow fibers are employed for the most diverse purposes in the field of dialysis. For example, such filters are utilized for haemodialysis, in which blood is passed through the inside of hollow fibers constructed with semi-permeable walls and dialysis fluid is caused to flow past the outside of the hollow fibers. During this process, diverse convection and diffusion processes take place across the walls of the hollow fibers which result in cleansing of the blood and removal of superfluous fluid. Furthermore, the electrolyte concentration in the blood is conditioned and buffers such as bicarbonate or acetate, for example, are added to the blood.

Filters of this kind are also utilized for so-called haemofiltration, in which a substitution fluid is added to the blood. The blood is fed through the hollow fibers, but no dialysis fluid flows past the outer surface of the hollow fibers. In this case, superfluous fluid, in particular water, is removed from the blood solely with the aid of a pressure difference across the membrane, i.e. the semi-permeable wall of the hollow fibers. The substitution fluid can be added to the blood either before the filter or after the filter.

The above-mentioned filters can also be used for producing the substitution fluid itself; they are then called ultrafilters. In this case, water is fed through the hollow fibers and, by means of a pressure difference across the membrane or semi-permeable walls, filtered through the same; the water is filtered sterile by the removal of bacteria and endotoxins as well as other contamination products.

Further utilizations of the above-mentioned filters are, for example, hemodialiftration, a combination of hemodialysis and hemofiltratoin, and plasmapheresis, in which the aqueous blood plasma is filtered out of the blood and fed back into the blood after treatment. However such filters are also used for reverse osmosis.

Several processes are known for making filters with membranes. For example, a process is known from German Patent No. 28 24 898, in which several hollow fiber lengths are continuously combined to form a bundle. This bundle is then fed step-wise to a potting apparatus that pots a limited area of the fiber bundle with a potting compound so that a firm block is created that encloses the hollow fibers. In this way, by the step-wise advancing of the fiber bundle, firm areas or blocks are formed on the fiber length at predetermined distances. In the subsequent process, the fiber length is divided into individual bundles by severing each of the firm blocks through the middle. In this manner, individual bundles with firm end regions are created. These firm end regions are processed in a further step such that the fiber bundle enclosed in the firm region terminates with open ends. The thus formed fiber bundle is then put into a two-part housing. Subsequently, the two housing parts are brought together and firmly joined.

A disadvantage of this known process is the many process steps, which are expensive in terms of apparatus and cost. Furthermore, with this known process only bundles of one size for filters, or filter housings of one size, can be produced. To produce fiber bundles with different sizes for filters of different sizes the potting device must be replaced. This determines the size of the fiber bundle.

Furthermore, with this known process there is a high danger of contamination for the hollow fibers and the finished fiber bundle, as numerous processing steps are necessary and consequently much time passes before the hollow fibers or the fiber bundle is enclosed in the housing and sealed from the environment.

This is true for the filters manufactured with this process as well as for other filters, for which a fiber bundle is fabricated in several processing steps and subsequently combined with other parts to form a filter. Examples for such filters are disclosed in German Patent Nos. 28 44 941, 28 45 002 and 28 45 003. The filters disclosed therein are each composed of several frames holding fiber bundles. The individual frames with finished fiber bundles are set on top of one another and clamped together by means of clamps, which form the housing. By adding end portions that include connections for inlet and outlet, the filter is finally completed.

Another known process consists of the feeding of hollow fibers to a winding wheel and winding these in sleeve lower parts arranged on the outer circumference thereof by turning the wheel. As soon as the desired fiber bundle thickness or fiber bundle size has been reached, the winding wheel is stopped and the sleeve upper parts are placed on the sleeve lower parts and fixed there. Subsequently, the hollow fibers are cut between the sleeves, the sleeves are removed from the winding wheel and transferred to apparatus for taking the finished fiber bundles out of the sleeves and placing them into tubular filter casings.

This known process also has the disadvantage of numerous processing steps, so that in addition to the high constructional expense and the attendant cost there also exists a high danger of contamination of the finished fiber bundle, as has been described in detail above.

From U.S. Pat. No. 4,341,005, a process is known in which hollow fibers are fed to a winding wheel and are wound in first housing portions of a filter placed on the periphery of the winding wheel. If the first housing portions are full or slightly overfull, a second housing portion is placed over each fiber filled first housing portion. The two housing portions are secured together, and the hollow fibers between the housings are then cut. The housings are removed from the winding wheel, and the hollow fibers at the ends of the housings are thereafter potted by centrifugal castings, which also permits the potting compound to join with or to adhere to the housing walls as well as to the hollow fibers. Following this potting the ends of the hollow fibers are again cut in the area of the potting compound to re-expose the hollow cores and end caps are sealed onto the housings to complete the filter.

Even if with this known process the risk for contamination of the finished fiber bundle is reduced, this known process still has the disadvantage of numerous processing steps.

From U.S. Pat. No. 4,343,668, a more complex process is known, where a potting compound is applied at spaced intervals on the hollow fibers during rotation of the winding wheel. This requires a complex device leading to high constructional expenses and attendant costs.

From U.S. Pat. No. 4,038,190, a process is known where hollow fibers are wound on a core, whereafter the core is placed in a housing.

This known process also has the disadvantage of numerous processing steps, so that in addition to the high constructional expenses and the attendant costs there is also a high risk for contamination of the finished fiber bundle as has been described in detail above.

In view of this background it is an object of the present invention to provide a method for producing filters with membranes of hollow fibers, for example for dialysis, whereby filters of any desired size can inexpensively and easily be reliably manufactured without excessive outlay, and with which the danger of contamination of the fiber bundle during fabrication of the filter is reduced.

A further object of the present invention is to provide a filter with membranes of hollow fibers, in which the hollow fibers are arranged essentially parallel to one another as a bundle in a tubular filter housing and that can be easily, inexpensively and reliably fabricated without excessive outlay.

SUMMARY OF THE INVENTION

In accordance with the present invention, these and other objects have now been realized by the invention of a method for producing hollow fiber membrane-containing filters including a filter housing having a first portion and a second portion and including a first end and a second end, the method comprising laying a plurality of the hollow fibers in the first portion of the filter housing to form a bundle of the hollow fibers, forming the first and second portions of the filter housing into the filter housing, sealing the first and second portions of the filter housing together, connecting the plurality of hollow fibers together at at least one of the first and second ends of the filter housing, connecting the plurality of hollow fibers to the filter housing and simultaneously adhering the first and second portions of the filter housing together by applying a potting compound thereto, and cutting the ends of the hollow fibers at the at least one of the first and second ends whereby the plurality of hollow fibers include open ends. In a preferred embodiment, the method includes sealing terminal end portions to the first and second ends of the filter housing so as to cover the ends of the hollow fiber bundle.

In accordance with one embodiment of the method of the present invention, the laying of the plurality of the hollow fibers in the first portion of the filter housing comprises mounting a plurality of the first portions of the filter housing on a rotary winding wheel, continuously feeding the hollow fibers to the plurality of first portions of the filter housing as the rotary winding wheel is rotated, whereby the hollow fibers are laid serially in the plurality of first portions of the filter housings, and severing the hollow fibers between the plurality of filter housings. In a preferred embodiment, the method includes severing the hollow fibers between the plurality of filter housings after the sealing of the first and second portions of the filter housing together.

In accordance with one embodiment of the method of the present invention, the first and second portions of the filter housing are flexibly connected to each other, and the sealing of the first and second portions of the filter housing together includes swinging the first and second portions together. In a preferred embodiment, the first and second portions of the filter housing are flexibly connected to each other by means of a film hinge.

In accordance with another embodiment of the method of the present invention, the first and second portions of the filter housing are each half shell shaped, whereby the filter housing is tubular.

In accordance with another embodiment of the method of the present invention, the sealing of the terminal end portions to the first and second ends of the filter housing comprises a sealing method such as gluing, welding or screwing.

In accordance with another embodiment of the method of the present invention, the method includes clamping the first and second portions of the filter housing together prior to sealing of the first and second portions of the filter housing together.

In accordance with the present invention, a hollow filter membrane-containing filter is provided comprising a tubular filter having a first portion and a second portion and including a first end and a second end, a bundle of hollow fibers disposed substantially parallel to each other within the filter housing, the first and second portions of the filter housing comprising half shell shapes, and potting compound connecting together the bundle of the hollow fibers at the first end of the tubular filter housing, connecting the bundle of hollow fibers to the tubular filter housing, and connecting the first and second potions of the tubular filter housing together. In a preferred embodiment, the hollow filter membrane includes a flexible connector connecting the first and second portions of the tubular filter housing together. In one embodiment the flexible connector comprises a film hinge.

In accordance with one embodiment of the hollow fiber membrane containing filter, the filter includes clamping members for connecting the first and second portions of the tubular filter housing together.

The objects of the present invention are achieved by means of a method wherein hollow fibers are laid one after the other in a first housing portion to form a bundle, subsequently a second housing portion is placed on the first housing portion to form a filter housing, the housing portions are joined in a sealed fashion, the hollow fibers are joined in a sealed fashion both to each other and to the filter housing at least at one end by means of a potting compound, and the potted fiber ends are cut so that the hollow fibers terminate with open ends, whereby the first housing portion and the second housing portion are adhered together by means of the potting compound when the hollow fiber ends are potted.

This obviates an additional processing step for providing a sealed joint between both housing portions, so that the method as a whole becomes simple and less expensive. Polyurethane can be used as a potting compound, for example. This is particularly favorable when polycarbonate or ABS (Acrylnitril-Butadiene-Styrol copolymer) is used as the material for the housing portions.

The advantageous method for adhering the two housing portions by means of the potting compound can also be reliably employed when the hollow fibers are to be connected in a sealed fashion to one another and to the housing portions or the filter housing only at one end. In this case, for example, the potting compound can be fed in a suitable manner to the contact surfaces of the housing portions and to the ends of the hollow fibers that are to be potted.

According to a preferred further embodiment, the hollow fiber bundle ends are each covered with a terminating part that is connected to the filter housing in a sealed fashion.

With this method it is possible to manufacture filters of any desired size simply and reliably, while at the same time, the danger of contamination is significantly reduced. The hollow fibers are laid one after the other in the filter housing to form a bundle, and the filter housing is closed directly after completing the fiber bundle. The fiber bundle is thus exposed to the surrounding atmosphere for only a short time, so that the risk of contamination of the fiber bundle is reduced. Also the risk of contamination of individual hollow fibers during the formation of the fiber bundle is reduced, as they are laid directly in the filter housing, and is not required to pass through several processing stages before arriving in the filter housing.

Laying the hollow fibers one after another in the filter housing has the further advantage that filters of any desired size can be produced easily and without replacing tools. Depending on the filter size, and thus the required size of the fiber bundle, only the required number of hollow fibers need be placed in the corresponding filter housing and the latter subsequently closed. In this manner, filters of any desired size, i.e. with any desired membrane surface, can be fabricated easily and with little outlay. In particular, it is no longer necessary to provide different tools for each of the different fiber bundle sizes.

The method according to the present invention is further simplified when, in accordance with a particularly preferred embodiment, the hollow fibers are fed continuously to a rotary winding wheel, on the outer circumference of which first housing portions are arranged. The housing portions are arranged such that the hollow fibers can be laid in these first housing portions as the wheel rotates, while after placing the second housing portions on the first housing portions the hollow fibers are severed between the filter housings.

In this manner, the filters can be produced in a particularly simple fashion. The hollow fibers are continually wound into the housing portions arranged on the outer circumference of the winding wheel until the desired fiber bundle thickness, and therefore the desired membrane surface is obtained. It is advantageous that several filters or fiber bundles can be made simultaneously in one process step, namely the winding of the hollow fibers on the winding wheel. The number of generated filters or fiber bundles depends, inter alia, on the diameter of the winding wheel. A winding wheel with a large diameter has a larger outer circumference on which more housing portions can be arranged one behind the other. Likewise, the width of the winding wheel determines the number of filters of fiber bundles that can be made in one processing stage. If the winding wheel is wide enough, two or more housing portions can be laid side by side, so that two or more rows of housing portions arranged one after another into which the hollow fibers can be wound are provided on the outer circumference. This all contributes to providing a simple and inexpensive method.

It is furthermore advantageous when, in accordance with another embodiment, the second housing portion is flexibly joined to the first housing portion so that it need only be swung onto the first housing portion. For example, the first and second housing portions could be flexibly joined by means of a film hinge. This simplifies and facilitates the manufacture of the filter housing itself, since the first and second housing portions can be formed together as one part.

A further improvement of the method of the present invention is obtained when both housing portions are formed half-shell-shaped, and the second half-shell-shaped housing portion is placed on the first half-shell-shaped housing portion to form a tubular filter housing. This facilitates on the one hand the winding of the hollow fibers in the first housing portion, as the half-shell shape of the first housing portion causes the hollow fibers to be centered as they are wound. On the other hand, the fiber bundle with the hollow fibers arranged essentially in parallel is surrounded in a manner adapted to its contours by the finished tubular filter housing. Thus, no superfluous space is present around the fiber bundle that could accommodate unnecessarily large amounts of dialysis fluid, for example. Furthermore, the fiber bundle is supported from the outside so that the individual hollow fibers are securely held in the bundle. Mechanical damage to the hollow fibers is consequently avoided.

The terminating parts covering the hollow fiber ends can be connected to the filter housing in any desired manner, provided that a sealed and reliable joint is obtained. However, it is advantageous when the terminating parts are glued or welded or are screwed on to the filter housing. In this manner, a simple, secure and reliable connection between terminating parts and filter housing is obtained.

The objects of the present invention are also achieved by means of an apparatus, wherein the tubular filter housing is composed of two half-shells, and wherein the two half-shells are adhered together by means of the potting compound.

In this manner, the filters can be made simply and inexpensively without excessive outlay, as the hollow fibers can be laid one after the other in a first half-shell. Depending on the desired filter size or fiber bundle size that determines the membrane surface, the required number of hollow fibers can be laid in the filter housing. The thus formed fiber bundle can then be covered directly by the second half-shell, that is placed on the first half-shell, so that, on the one hand, damage to the hollow fibers, or the fiber bundle, by external forces is avoided, and on the other hand, the risk of contamination is reduced.

In accordance with a preferred embodiment, it is advantageously provided that the tubular filter housing is composed of two flexibly connected half-shells, the two half-shells being preferably flexibly connected by means of a film hinge. In this manner, the manufacture of the filter housing per se is inter alia simplified, because the first and second half-shells are formed as one piece and can be fabricated together. After laying the hollow fibers in the first half-shell, the second half-shell need only be swung onto the first half-shell to form the tubular housing for the filter.

BRIEF DESCRIPTION OF THE DRAWINGS

Further features and advantages of the present invention will be described in more detail with reference to the following detailed description, which, in turn, refers to the enclosed drawings, wherein:

FIG. 6 is a top, plan view of an open filter housing for connecting both housing portions in a sealed fashion by means of the potting compound; and FIG. 7 is a side perspective view of a filter housing with terminating parts joined in a sealed manner by means of the potting compound of the present invention.

DETAILED DESCRIPTION

Figure 1:
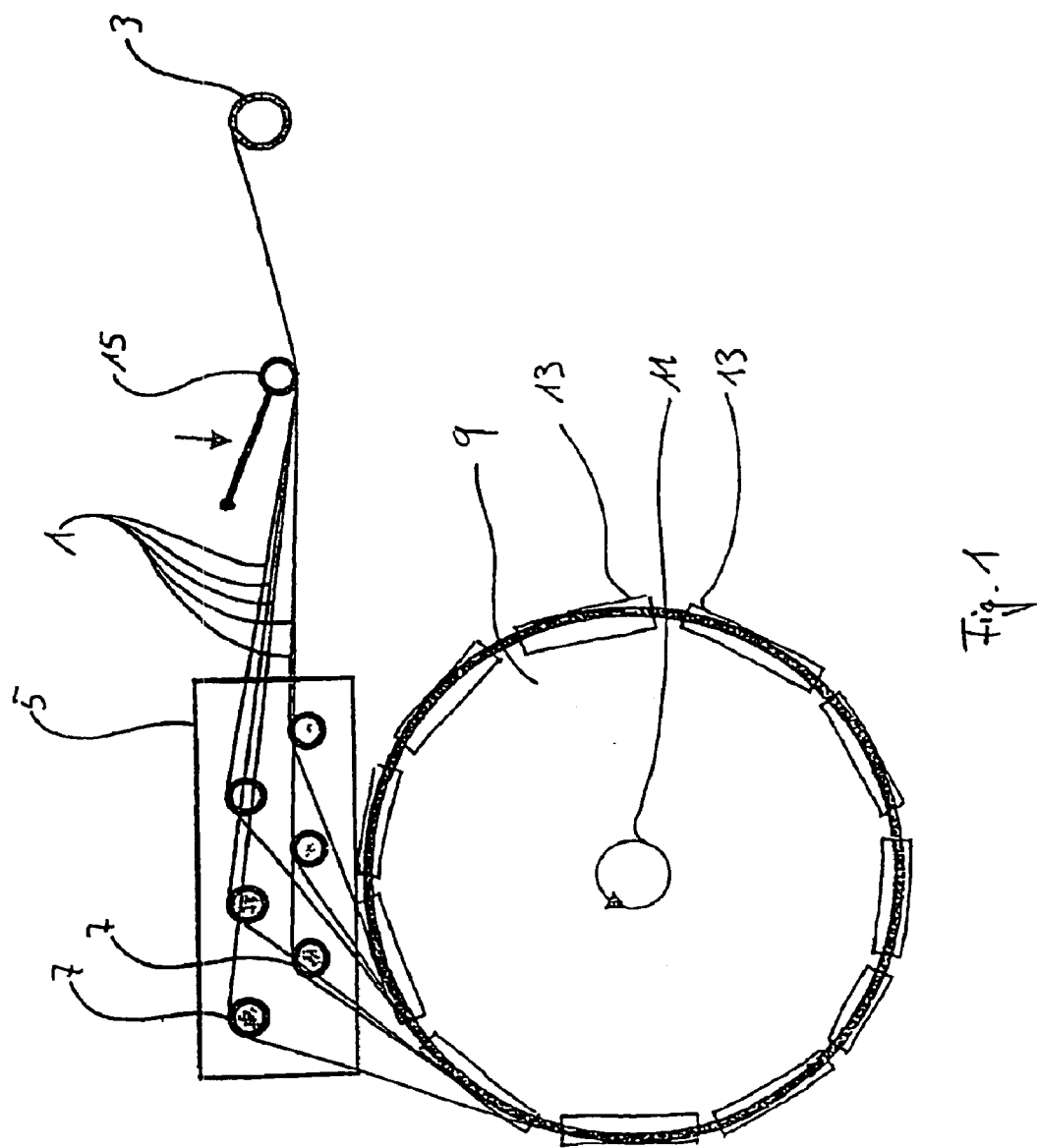
FIG. 1 is a side, elevational, schematic view of a winding wheel used in the method of the present invention.

Referring to the drawings, FIG. 1 shows a side view of a winding wheel 9. On the outer circumference of the winding wheel 9 several filter housings 13 are arranged in such a way that hollow fibers 1 can be wound in the filter housing 13. The hollow fibers 1 are fed from a supply roller 3 to a distributor apparatus 5, and from there further to the winding wheel 9. It is to be noted at this point that the hollow fibers could also be supplied to the distributor apparatus directly from a production machine, or spinning machine.

Several distributor rollers 7 are arranged on the distributor apparatus 5 and each feeds individual hollow fibers 1 to the filter housings 13 arranged on the winding wheel 9. The distributor rollers 7 are movable in their longitudinal axes and are controlled such that the individual hollow fibers 1 are placed in the filter housings 13 offset relative to one another and distributed across the whole housing width. The hollow fibers 1 are unwound from the supply roller 3 and wound on the winding wheel 9, or rather in the filter housings 13 arranged on the outer circumference of the winding wheel, as the winding wheel 9 is turned as indicated by the arrow 11. A tension roller 15 is disposed between the supply roller 3 and the distributor apparatus 5 and holds the hollow fibers 1 under a certain tension to enable the controlled deposit or winding of the hollow fibers 1 in the filter housings 13 on the winding wheel. The tension can be applied to the tension roller 15, or the hollow fibers 1, as indicated by the arrow at 15 using spring force or weight.

The individual distributor rollers 7 can also each feed two or more hollow fibers 1 to the filter housings 13 disposed on the winding wheel 9. In this case, the hollow fibers 1 supplied to the filter housings 13 by the different distributor rollers 7 are placed in the filter housings 13 displaced in groups relative to one another.

Figure 2:
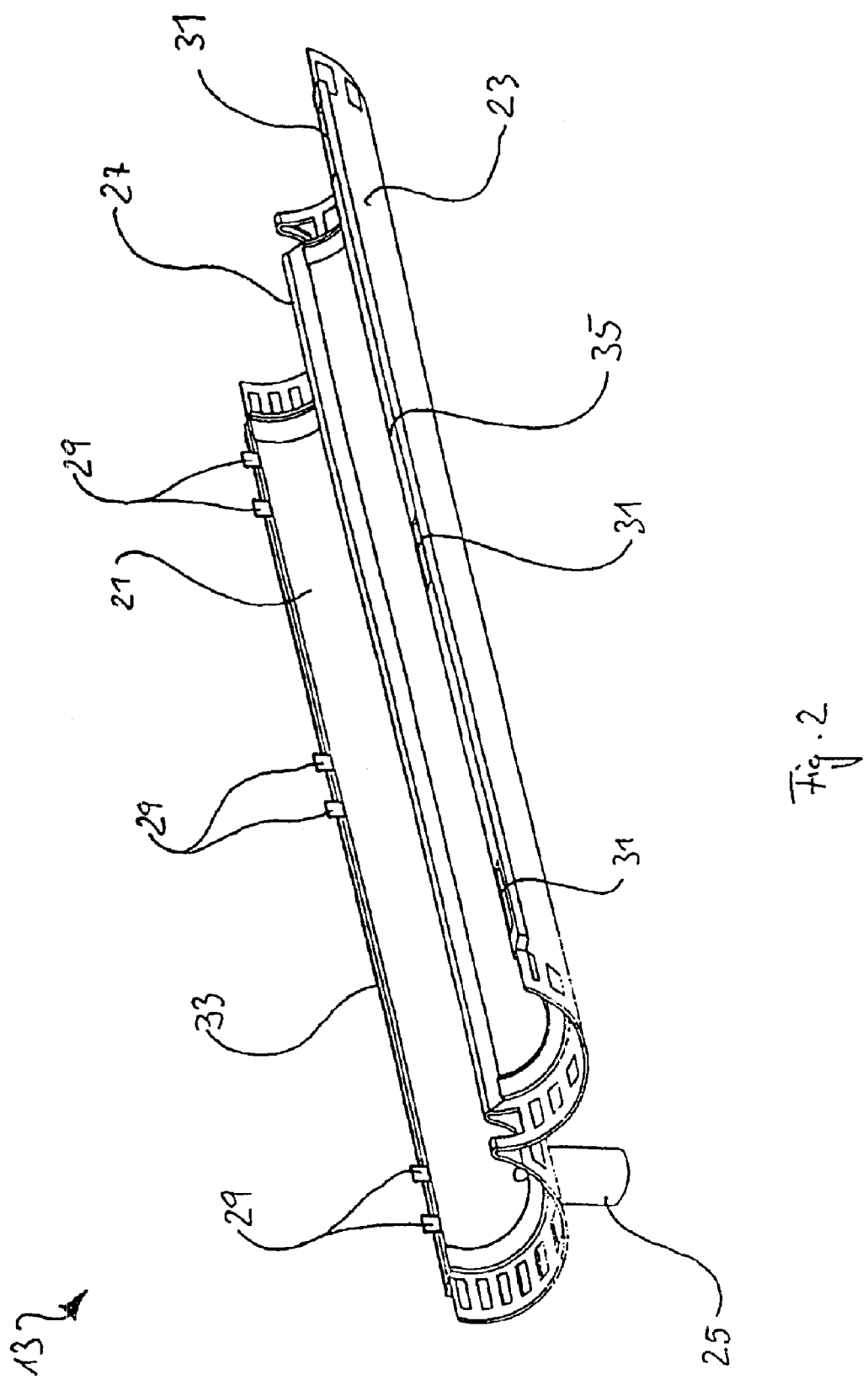
FIG. 2 is a side, perspective view of an open filter housing.

FIG. 2 shows a perspective view of an open filter housing 13. The filter housing 13 consists of a first half-shell-shaped housing portion 21 and a second half-shell-shaped housing portion 23, that are flexibly connected with one another by means of a film hinge 27. The first housing portion 21 comprises a connection 25 and a weld or adhesion strip 33 on the longitudinal side opposing the film hinge 27. The second housing portion 23 likewise comprises a weld or adhesion strip 35 on the longitudinal side opposing the film hinge 27. Several clamp stubs 29 are disposed on the weld or adhesion strip 33 of the first housing portion 21 and are constructed such that they can engage with correspondingly constructed apertures 31 on the weld or adhesion strip 35 of the second housing portion 23. To close the filter housing 13, the second housing portion 23 is pivoted onto the first housing portion 21 by means of the film hinge 27, so that the clamp stubs 29 latch into the apertures 31 and affix the first and second housing portions, 21 and 23, together, with the weld and adhesion strips, 33 and 35, lying on top of one another. These are then joined in a sealed fashion by welding or gluing, as will be described later in more detail.

However, the sealed connection of the two housing portions 21 and 23 occurs only when the desired number of hollow fibers 1 has been laid in the first housing portion 21 and forms the desired bundle. To permit this, the filter housing 13 is disposed on the outer circumference of the winding wheel 9 (FIG. 1) in the open state shown in FIG. 2 in such a manner that at least the inside of the first housing portion 21 is directed outwardly. In this way, the hollow fibers 1 can be wound into the filter housing 13 as described with reference to FIG. 1.

Figure 3:
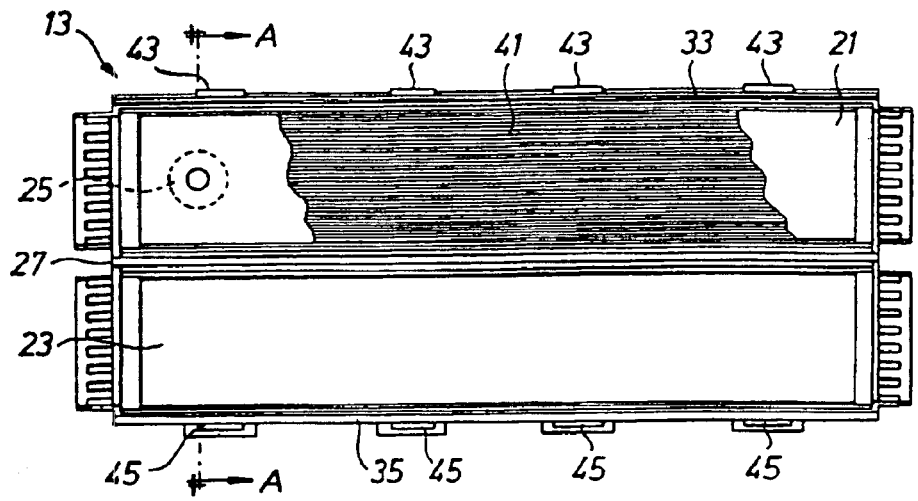
FIG. 3 is a top, plane view of an open filter housing with a partially shown fiber bundle.

FIG. 3 shows a plan view of a filter housing 13, wherein a hollow fiber bundle 41 arranged in the first housing portion 21 is partially depicted. The filter housing 13 corresponds essentially to the filter housing 13 shown in FIG. 2 and described with reference to FIG. 2, so a renewed detail description can be dispensed with. In contrast to the filter housing 13 shown in FIG. 2, the clamp stubs 43 are not arranged on the weld or adhesion strip 33, but rather on the outer edge of same. Also, the apertures 45 are not arranged in the weld or adhesion strip 35 of the second housing portion 23, but likewise on the outer edge of same.

It should be noted at this stage that the connector 25 arranged on the first housing portion 21 need not necessarily be disposed there. For example, the connector 25 could also be arranged on the terminating part that is described below in detail. Likewise, the connector 25 could be arranged on the second housing portion 23, or two or more connectors 25 could be provided, which may be arranged on the first or second housing portions, 21 and 23, or on the terminating parts still to be described, as desired.

Figure 4:
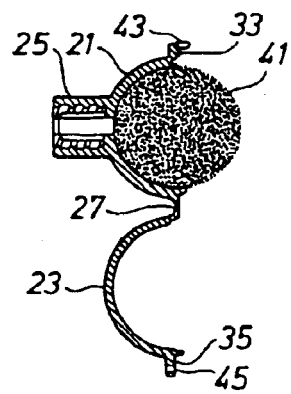
FIG. 4 is a front, elevational, sectional view through the filter housing of FIG. 3 taken along line A—A thereof.

As can be seen well in FIG. 3, the hollow fiber bundle 41 lies with hollow fibers 1 arranged essentially in parallel in the half-shell-shaped first housing portion 21 and fills the latter substantially completely. This can also be seen well from FIG. 4, which shows a section through the filter housing 13 along line A—A in FIG. 3. The hollow fiber bundle 41 fills the cross section essentially fully, so that when the filter housing 13 is closed, that is, when the second housing portion 23 has been swung onto the first housing portion 21, it is supported mechanically by the filter housing 13. However it is not compressed by the filter housing 13; the hollow fibers are still separated from one another by a certain space or play.

Figure 5:
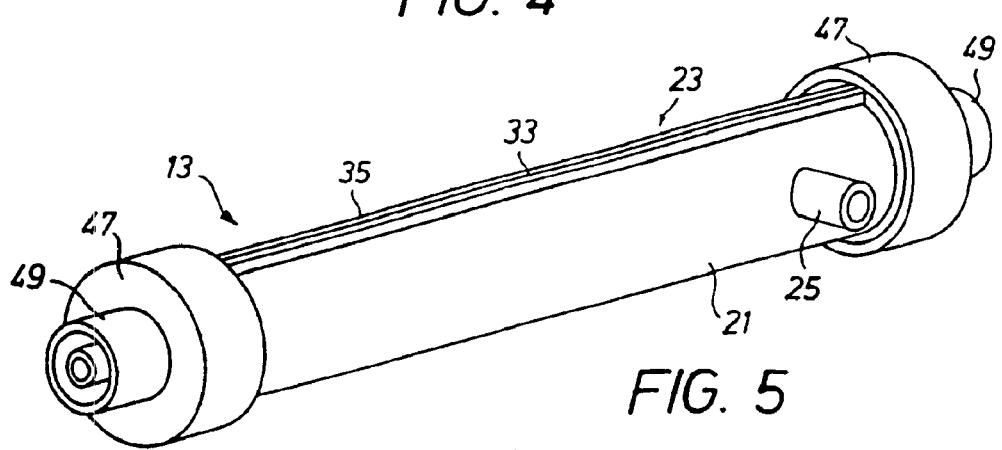
FIG. 5 is a side, perspective view of a filter housing connected in a sealed fashion by means of ultrasound welding, with terminating parts.

FIG. 5 shows a perspective view of a filter housing 13 in the closed state with mounted terminating parts 47. The terminating parts 47 that are placed, respectively, on the ends of the tubular filter housing each comprise a further connector 49. As for the connectors 25, the connectors 49 can be of any desired structure and, for example, can comprise a screw thread for connecting a conduit. The terminating parts 47 themselves can be placed on the filter housing in any desired manner, for example, they can be screwed on or be connected in a sealed fashion to the filter housing by welding or adhesion. In the embodiment illustrated, the first housing portion 21 and the second housing portion 23 of the filter housing 13 are connected together in a sealed manner by ultrasonic welding of the weld strip 33 on the first housing portion 21 to the weld strip 35 on the second housing portion 23.

This is only one possibility for connecting the first and second housing portions, 21 and 23, in a sealed fashion. Another possibility that was mentioned above, is the gluing together of the first and second housing portions, 21 and 23, by means of the potting compound when potting the hollow fibers. A plan view of a correspondingly formed filter housing 13 is shown in FIG. 6.

To simplify the description, like parts are provided with like reference numerals. In contrast to the above described filter housings 13, the first and second housing portions, 21 and 23, each comprise a potting strip 51 on their longitudinal sides opposing the film hinge 27. In their central areas, the potting strips 51 each have a potting aperture 53 and, at their ends, an outlet aperture 57. A potting channel 55 extends from the potting aperture 53 on both sides towards the outlet apertures 57. Clamping means 59 are arranged in the potting strip 51 on the first housing portion 21 and are formed such that they engage with corresponding clamping means 61 arranged in the potting strip 51 of the second housing portion 23. These clamping means, 59 and 61, engage in one another and hold the filter housing 13 in a closed position when the second housing portion 23 is swung onto the first housing 21 by means of the film hinge 27.

In this closed state shown in FIG. 7, the potting strips 51 of the first and second housing portions, 21 and 23, lie against one another so that the potting channel 55 is closed. If a potting compound, for example polyurethane, is now poured into the potting aperture 53, it will flow through the potting channel 55 towards the outlet apertures 57 and will exit there through these outlet apertures 57 into the interior of the filter housing 13, to pot the hollow fiber ends. The flow movement of the potting compound towards the outlet apertures 57 and thus the potting of the hollow fiber ends can, for example, be effectively assisted when the filter housing 13 is rotated to generate centrifugal forces acting in the direction of the ends of the filter housing 13.

After hardening, the potting compound remaining in the potting channel 55 sticks together the connected housing portions, 21 and 23, that are affixed by means of the clamping means, 59 and 61, and seals the joint at the same time. A filter housing 13 made in this way is shown in perspective view in FIG. 7. Here again, like parts are provided with like reference numerals to simplify the description. Here the combined potting strips 51 with the potting aperture 53 in the centre are easily identifiable.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for producing hollow fiber membrane-containing filters including a filter housing having a first portion and a second portion and including a first end and a second end, said method comprising laying a plurality of said hollow fibers in said first portion of said filter housing to form a bundle of said hollow fibers, comprising mounting a plurality of said first portions of said filter housing on a rotary winding wheel, continuously feeding said hollow fibers to said plurality of first portions of said filter housing and said rotary winding wheel is rotated whereby said hollow fibers are laid serially in said plurality of first portions of said filter housings, forming said first and second portions of said filter housing into said filter housing, connecting said plurality of hollow fibers together and to at least one of said first and second ends of said filter housing and simultaneously sealing said first and second portions of said filter housing together by applying a potting compound through a potting aperture and along a potting strip disposed substantially along the entire length of said filter housing through an outlet aperture into said at least one of said first and second ends of said filter housing containing said plurality of hollow fibers to provide both a sealed housing and a connected plurality of hollow fibers, and cutting said ends of said hollow fibers at said at least one of said first and second ends of said filter housing whereby said plurality of hollow fibers include open ends.

2. The method of claim 1 including sealing terminal end portions to said first and second ends of said filter housing so as to cover said open ends of said hollow fiber bundle.

3. The method of claim 1 wherein said first and second portions of said filter housing are flexibly connected to each other, and wherein said forming of said first and second portions of said filter housing together includes swinging said first and second portions together.

4. The method of claim 3 wherein said first and second portions of said filter housing are flexibly connected to each other by means of a film hinge.

5. The method of claim 1 wherein said first and second portions of said filter housing are each half shell shaped, whereby said filter housing is tubular.

6. The method of claim 2 wherein said sealing of said terminal end portions to said first and second ends of said filter housing comprises a sealing method selected from the group consisting of gluing, welding and screwing.

7. The method of claim 1 including clamping said first and second portions of said filter housing together prior to said connecting step.

8. A hollow filter membrane-containing filter comprising a tubular filter and a filter housing having a first portion and a second portion and including a first end and a second end and a potting aperture accessible after said first and second portions of said filter housing are connected together, said potting aperture disposed between said first end and said second end, a potting strip substantially along the entire length of said filter housing and an outlet aperture connecting said potting strip to said first end of said filter housing, a bundle of hollow fibers disposed substantially parallel to each other within said filter housing, said first and second portions of said filter housing comprising half shell shapes, and potting compound connecting together said bundle of said hollow fibers at said first end of said tubular filter housing, connecting said bundle of hollow fibers to said filter housing, and connecting said first and second potions of said filter housing together substantially along the entire length of said potting strip along said filter housing.

9. The hollow filter membrane containing filter of claim 8 including a flexible connector connecting said first and second portions of said filter housing together.

10. The hollow fiber membrane containing filter of claim 9 wherein said flexible connector comprises a film hinge.

11. The hollow fiber membrane containing filter of claim 8 including clamping members for connecting said first and second portions of said filter housing together.

* * * * *